US00RE35624E

United States Patent [19]

Kiilunen et al.

[11] E Patent Number: Re. 35,624

[45] Reissued Date of Patent: *Oct. 7, 1997

[54] WIRES MADE OF COPPER-BASED ALLOY COMPOSITIONS

[76] Inventors: David D. Kiilunen, 8821 Maltby Rd., Brighton, Mich. 48116; David A. Sartor, 34104 Calendar Ct., Sterling Heights, Mich. 48310

[ * ] Notice: The portion of the term of this patent subsequent to Mar. 31, 2009, has been disclaimed.

[21] Appl. No.: 516,002

[22] Filed: Aug. 16, 1995

Related U.S. Patent Documents

Reissue of:

[64] Patent No.: 5,236,662
Issued: Aug. 17, 1993
Appl. No.: 833,454
Filed: Feb. 6, 1992

U.S. Applications:

[60] Continuation-in-part of Ser. No. 622,494, Dec. 3, 1990, Pat. No. 5,100,617, which is a division of Ser. No. 461,296, Jan. 5, 1990, Pat. No. 5,013,587.

[51] Int. Cl.[6] ..... C22C 9/02

[52] U.S. Cl. ..... 420/471; 148/23; 219/145.22

[58] Field of Search ..... 420/470, 471, 420/489, 490; 148/23, 24; 219/145.22, 146.22

[56] References Cited

U.S. PATENT DOCUMENTS

| | | | |
|---|---|---|---|
| 293,827 | 2/1884 | Weiller | 420/470 |
| 2,257,437 | 9/1941 | Weiser | 420/470 |
| 4,436,790 | 3/1984 | Prinz et al. | 420/471 |
| 5,035,280 | 7/1991 | Huin et al. | 164/463 |
| 5,100,617 | 3/1992 | Kiilunen et al. | 420/470 |

FOREIGN PATENT DOCUMENTS

| | | | |
|---|---|---|---|
| 179098 | 7/1954 | Austria | 420/471 |
| 57-145955 | 9/1982 | Japan | 420/470 |
| 59-170231 | 9/1984 | Japan | 420/471 |
| 60-68190 | 2/1985 | Japan | 219/145.22 |
| 60-128234 | 7/1985 | Japan | 420/471 |
| 61-3697 | 1/1986 | Japan | 219/145.22 |
| 1400833 | 6/1988 | U.S.S.R. | 219/145.22 |

*Primary Examiner*—George Wyszomierski
*Attorney, Agent, or Firm*—Gifford, Krass, Groh, Sprinkle, Patmore, Anderson & Citkowski, P.C.

[57] ABSTRACT

Wires made of copper-based compositions are disclosed, in which the compositions preferably contain aluminum, tin, and silicon. Formulations containing solely tin and aluminum, and solely tin and silicon are also disclosed. By practice of the invention, substantial improvements in bond strength and quality of the surface finish are achieved, as compared with prior art wire compositions.

10 Claims, No Drawings

WIRES MADE OF COPPER-BASED ALLOY COMPOSITIONS

Matter enclosed in heavy brackets [ ] appears in the original patent but forms no part of this reissue specification; matter printed in italics indicates the additions made by reissue.

This application is a continuation-in-part of our application Ser. No. 622,494 filed Dec. 3, 1990, now U.S. Pat. No. 5,100,617, which is a divisional of Ser. No. 461,296, filed Jan. 5, 1990, now U.S. Pat. No. 5,013,587.

BACKGROUND OF THE INVENTION

It is known in the art to which the invention pertains that during the course of manufacture metal bodies develop surface imperfections therein. Illustratively, in the automotive art, bare metal sections which ultimately form the automobile body are welded together. Inherently in this procedure there results porosity in the weld joint, and ripples or deformations in the metal surfaces proximate to the zone of the welding operation.

Quality consideration dictate that such imperfections be remedied, and the use of solder has been one means employed by the prior art. The soldering technique, however, is disadvantageous from the standpoint of being time-consuming, but also, since a flux is required, there arises the problems of toxicity and later flux removal.

One expedient currently in use in substitution for solder is a silicon bronze alloy, and one material of this type of which applicants have knowledge contains approximately 2.8% to 4.0% silicon. Silicon bronze has the significant advantage over solder of substantial time savings, since it can be applied to the metal surfaces by thermal spraying. When arc spraying is employed, there is less heat transfer to the base, and consequently less distortion thereof. However, in the environment of assembly of bare automobile parts of steel sheet, wherein the general sequence of steps is welding, grinding, thermal spraying, and grinding, even the use of silicon bronze as the sprayable material gives rise to disadvantageous results. Stated briefly, in the second grinding step just mentioned, time and materials expended in the performance thereof have been found to be quite substantial. Additionally, upon completion of the four steps briefly noted, less than optimum results are often noted with respect to bond strength and surface appearance.

SUMMARY OF THE INVENTION

Applicants have discovered that there is obtained markedly improved results in the coating of a variety of bare metal substrates by thermal spraying thereon a copper base composition containing tin, silicon, and aluminum. More broadly stated, and prior to thermal spraying, the composition of this invention without the presence of aluminum may be employed in the production of weldments. However, as the description proceeds, it will be noted that the present composition containing aluminum, when employed for welding applications, helium rather than argon is the inert shielding gas generally utilized. Further, the composition of this invention without the presence of aluminum can be thermally sprayed, although optimum bond strengths may not at all times be obtained.

In the practice of the present invention an arc spray gun is preferably employed, although a combustion metallizing gun may at times be found suitable. The wire fed to the gun is preferably flux cored wire; however, solid wire is also within the contemplation of this invention, as will be further noted hereinafter.

If a wire diameter of 0.045 inches is employed, the composition of this invention has broad maximums of up to about 15.0% tin, up to approximately 2.0% silicon, up to about 6.0% aluminum, and the balance copper. Should the wire diameter selected by 0.062 inches, the broad maximums of the ingredients of applicants' compositions are up to about 20.0% tin, up to approximately 5.0% silicon, up to about 6.0% aluminum, and the balance copper. By proceeding in accordance with the foregoing, markedly improved results are obtained, particularly by way of bond strengths and surface finishes with an absence of voids therein.

DESCRIPTION OF A PREFERRED EMBODIMENT

While applicants do not wish to be bound by a particular theory, it would appear that aluminum and tin in the composition of this invention contribute importantly to the novel results described herein. From the standpoint of bond strength or adhesion of the coating to a bare metal substrate, the aluminum appears to combine with oxygen in the atmosphere, producing an exothermic reaction. This in turn provided heat to the copper, tin and silicon particles in the composition, and thus being at a substantially elevated temperature, these particles adhere will to the bare metal substrate by a mechanical rather than metallurgical bond. Comparative data on bond strengths of applicants' composition and a known silicon bronze alloy will be set forth hereinafter.

The presence of tin in the composition of this invention, on the other hand, appears to contribute significantly to a visibly smooth or void-free surface finish, and the related aspect of ease of grindability. It is possible that tin also forms an oxide with the atmosphere, and combines with the copper to form an alloy which is softer when compared with silicon bronze. While other theories may exist as to the interaction which takes place between the tin and the other ingredients of the present formulation during thermal spraying, it has been found in actual practice that during the second grinding step earlier noted, there is what may be termed a better "feathering in" or "grindability" of the surface finish. In other words, there is much improved blendability, indicating even to the naked eye an absence of voids or porosity in the surface finish.

It will be noted hereinafter that it is within the purview of this invention to provide a copper-based composition in which silicon is not present with the aluminum and tin. However, in work performed to date, there has been observed some sacrifice in grinding efficiency. Notwithstanding this, an acceptable surface finish is generally obtained.

In contrast, the silicon bronze material presently used in the thermal spraying for the automotive applications earlier noted, appears to be a much harder alloy. As a consequence, a much greater number of grinding discs are required, generally by reason of the clogging thereof, which appears to be due in part to the hardness of the alloy. Consequently, the time required to produce a commercially acceptable surface finish is substantially greater.

The approximate upper limits of the ingredients of applicants' composition for thermal spraying applications have been set forth hereinabove, it being noted that there is a relationship to wire diameter. More specifically, in work performed to date, the following compositions have been utilized:

| DESIGNATION | TIN | SILICON | ALUMINUM | COPPER |
|---|---|---|---|---|
| A | 5.5 | 2.0 | 1.0 | Balance |
| B | 5.5 | 2.0 | — | Balance |
| C | 9.5 | 2.0 | 1.5 | Balance |
| D | 0.5 | 3.0 | 0.5 | Balance |
| E | 10.0 | — | 6.0 | Balance |
| F | 10.0 | 0.25 | 6.0 | Balance |

Components in parts by weight, based on 100 parts.

Compound "B" is particularly well suited for welding applications, although it may be used in thermal spray applications at some modest sacrifice in bond strength. Compounds "A" and "C" have greatest utility for thermal spray applications, although as was noted above, they can be used for welding, if helium is used in place of argon as the inert shielding gas.

By way of Example, a quantity of flux cored wire was produced from an essentially copper strip and in which the fill was Compound "A" as above set forth. The wire diameter was approximately 0.045 inches, and this wire was fed into a Model 8830 arc spray gun manufactured by TAFA Incorporated of Concord, New Hampshire. Utilizing a flux cored wire of the diameter indicated, the spray gun was adjusted to a voltage of 28 in order to deliver of a fine mist at 40 psi. A number of bare steel plates measuring 8×8 inches were sprayed to a coating thickness of about 0.045 inches. A similar procedure was used with silicon bronze wire, understood to contain 2.8% to 4.0% silicon.

The two sets of coated plates were then tested in the following manner to determine the bond strengths of the two types of coatings. The coated surfaces of two plates, each pair having been sprayed with Composition "A" and the other with silicon bronze, had applied thereto a commercially available epoxy cement, understood to have a bond strength of 10–12,000 psi. After drying, pull forces were applied to each set of plates, and Composition "A" plates had a coating bond strength of about 4.065 psi, while the silicon bronze coated plates had a bond strength of only approximately 3,000 psi. This is considered to be quire significant, since it clearly indicates that there is little likelihood of applicants' coating flaking from the bare metal surface which ultimately provides an automobile body part subject to shaking, bumping, or other rather strenuous road conditions.

Ease of grindability and the quality of the surface finish obtained are additional factors wherein noticeable improvements result from practice of the novel concepts of this invention. The presence of tin in the composition is believed to contribute importantly in this area by producing after deposition with the other ingredients what may be termed a "softer" finish. The grind rate is improved for the standpoint that a lesser number of grinding discs are required in order to produce the desired blemish-free surface finish, as compared with a deposit of silicon bronze. In this manner, the savings of time and materials are quite significant.

The quality of the surface finish is considered critical in the production of automobile body parts. The initial surface coating, or under coating, as produced in the manner hereinabove described, is in effect duplicated in subsequent paint coats. In other words, any ripples, undulations, voids, or other imperfections in the bare metal surface coating carry through the later-applied paint coats and are clearly visible therein. High quality in the surface finish of the initial surface coating is accordingly highly important.

It has been noted by applicants that substantial differences are found in the surface finish produced by the filler metal of this invention and that provided by silicon bronze. Utilizing the same type grit discs employed in automobile body part plants, the present filler metal designated as Composition "A" above feathered well during the passes of the grinding wheel, and there was excellent blending in the finish as the strokes were made. The completed finish had feathered or blended very well into the steel, indicating high quality. In work performed to date, like results have not produced from a silicon bronze coating.

With respect to the compositions designated as "A", "D", "E", and "F" in the tabulation above presented, investigations have been conducted which demonstrate the superiority of applicants' coatings from the standpoint of quality of the surface finish. The tests were directed to the comparative removal rates of the compositions set forth, which are indicative of anticipated production line grinding speeds employing a minimum number of grinding discs required to produce a high quality surface finish, as described above.

Bare steel plates measuring 8×8 inches were sprayed to a coating thickness of about 0.020 inches, employing flux cored wire produced from an essentially copper strip in which the combination of strip and fill in each case was Compound "A", "D", "E", or "F". The wire diameter for each composition was approximately 0.045 inches, and this wire was fed into a Model 8830 arc spray gun manufactured by TAFA Incorporated of Concord, New Hampshire. Utilizing a flux cored wire of the diameter indicted, the spray gun was adjusted to a voltage of 28 (100 amps) at 70 psi.

The bare steel plates as coated in the manner described were then ground, employing 50 grit paper, 7" disc, and a 4,000 rpm sander. Each plate was ground for 45 seconds, however, each was weighted at 15 second intervals. The following results were obtained:

| | | Compound A | Compound D | Compound E | Compound F |
|---|---|---|---|---|---|
| 1st grind | 15 sec. | 4.4 gms. | 4.0 gms. | 1.6 gms. | 3.5 gms. |
| 2nd grind | 15 sec. | 2.5 | 1.5 | 1.6 | 1.2 |
| 3rd grind | 15 sec. | 1.5 | 1.5 | 1.6 | 0.4 |
| TOTAL | 45 sec. | 8.4 gms. | 7.0 gms. | 4.8 gms. | 5.1 gms. |

In addition to being superior to the mentioned silicon bronze alloy, applicant's novel wire is a marked improvement over a known copper-base alloy solid wire as measured by removal rate. This particular solid wire is understood to be made up of approximately 0.72% aluminum, about 1.78% tin, about 0.26% silicon, and the balance copper, with minor amounts of manganese and zinc. Components are given in parts by weight, based on 100 parts.

This known copper-based alloy solid wire at a diameter of about 0.045 inches was sprayed and utilized under the same test conditions described above in connection with Compounds "A", "D", "E", and "F". A total of 4.6 grams of material was removed over a 45 second period, the first grind removing 1.7 grams after 15 seconds, the second grind 1.5 grams after 15 seconds, and the third grind 1.4 grams after 15 seconds. While the surface finish as judged to be generally acceptable, the low removal rate, as compared with applicant's compositions, substantially lengthens the grinding process and generally could not be tolerated in a production environment.

Changes and modifications to the formulations and procedures of this invention have been described herein, and these and other variations may, of course, be practiced without departing from the spirit of the invention or the scope of the subjoined claims.

We claim:

1. A flux cored wire for application to essentially bare metal surfaces, said wire being constructed of a copper-base alloy consisting essentially of about 10.0% tin and approximately 6.0% aluminum.

2. A flux cored wired for thermally spraying bare metal surfaces having imperfections therein, said wire being constructed of a copper-base alloy consisting essentially of about 10.0% tin and approximately 6.0% aluminum.

3. A flux cored wire for thermally spraying essentially bare metal surfaces having surface imperfections therein, said wire being constructed of a copper-base alloy consisting essentially of from about 0.5% to about 20.0% tin, from about 0.25% to about 5.0% silicon, and from about 0.5% to about 6.0% aluminum.

4. A flux cored wire as defined in claim 3, in which tin is present in an amount of about 10%, silicon is present in an amount of about 0.25%, and aluminum is present in an amount of about 6.0%.

5. A flux cored wire as defined in claim 3, in which tin is present in an amount of about 0.5%, silicon is present in an amount of about 3.0%, and aluminum is present in an amount of about 0.5%.

*6. A solid wire for application to essentially bare metal surfaces, said wire being constructed of a copper-alloy consisting essentially of about 10.0% tin and approximately 6.0% aluminum.*

*7. A solid wire for thermally spraying bare metal surfaces having imperfections therein, said wire being constructed of a copper-base alloy consisting essentially of about 10.0% tin and approximately 6.0% aluminum.*

*8. A solid wire for thermally spraying essentially bare metal surfaces having surface imperfections therein, said wire being constructed of a copper-base alloy consisting essentially of from about 0.5% to about 20.0% tin, from about 0.25% to about 5.0% silicon, and from about 0.5% to about 6.0% aluminum.*

*9. A solid wire as defined in claim 8, in which tin is present in an amount of about 10.0%, silicon is present in an amount of about 0.25%, and aluminum is present in an amount of about 6.0%.*

*10. A solid wire as defined in claim 8, in which tin is present in an amount of about 0.5%, silicon is present in an amount of about 3.0%, and aluminum is present in an amount of about 0.5%.*

* * * * *